United States Patent [19]
Shimizu et al.

[11] Patent Number: 5,168,407
[45] Date of Patent: Dec. 1, 1992

[54] FLYING MAGNETIC HEAD

[75] Inventors: Tatsushi Shimizu; Hideo Aoki; Nobuo Imazeki, all of Toda, Japan

[73] Assignee: Nippon Mining Company, Ltd., Tokyo, Japan

[21] Appl. No.: 612,935

[22] Filed: Nov. 13, 1990

[30] Foreign Application Priority Data

Mar. 26, 1990 [JP] Japan .................................. 2-76365
Aug. 1, 1990 [JP] Japan .................................. 2-204202

[51] Int. Cl.$^5$ ............................................. G11B 5/60
[52] U.S. Cl. ................................................... 360/103
[58] Field of Search ........................................ 360/103

[56] References Cited

U.S. PATENT DOCUMENTS 4,851,942  7/1989  Kumasaka ........................... 360/103
5,008,767  4/1991  Iwata .................................. 360/103

FOREIGN PATENT DOCUMENTS 18617   1/1987  Japan .
 2216   1/1988  Japan .
189020  7/1989  Japan .

Primary Examiner—A. J. Heinz
Attorney, Agent, or Firm—Seidel, Gonda, Lavorgna & Monaco

[57] ABSTRACT

A flying magnetic head is provided in which a head core, formed by laminating a magentic thin film on a non-magnetic substrate, is fitted into a slot formed in a slider through a bonding glass layer. The substrate of the head core and the slider are formed from the same material. The coefficient of thermal expansion of the head core substrate is substantially the same as that of the magnetic thin film. The thickness of the bonding glass layer which bonds the head core to the slider is reduced to 20 μM or less.

5 Claims, 7 Drawing Sheets

FLYING MAGNETIC HEAD

BACKGROUND OF THE INVENTION

1. Field of the Invention

The present invention relates to a flying magnetic head for rigid disk applications, and more particularly, to a composite flying magnetic head whose head core comprises a laminated thin film core.

2. Description of the Related Art

Generally, the flying magnetic head for rigid disk applications is composed of a slider and a head core, and is attached to a suspension system for maintaining the head slider in position on or above a magnetic disk surface.

Conventional flying magnetic heads include (1) the monolithic type whose slider is manufactured by forming a gap in part of a ferrite and then by cutting and polishing that ferrite into a predetermined form, and (2) the ferrite composite type manufactured by bonding a head core made of ferrite to a slider made of a non-magnetic material such as a ceramic using glass. Recently, the so-called MIG (metal-in-gap) composite flying magnetic head in which magnetic thin films are deposited onto either side or both sides of a gap formed in a ferrite head core has been drawing attention. These magnetic thin films are made of Fe-Si-Al alloy (Sendust) or an amorphous magnetic material both of which have a high saturation magnetic flux density and a magnetic permeability exhibiting excellent high-frequency characteristics, and which thus assure high density recording. In the ferrite and MIG composite flying magnetic heads, a head core 1 is fitted into and bonded by means of a bonding glass 4 to a slot 3 which has a predetermined form and which is formed in a ceramic slider 2 obtained by cutting and polishing a monolithic ceramic, as shown in FIG. 5.

Figure 6A:
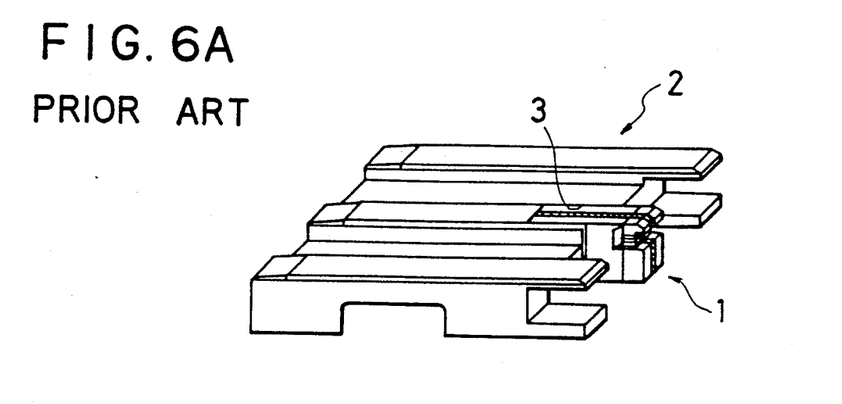
FIG. 6(A) is a perspective view of a conventional thin, film laminated, composite, flying magnetic head, FIG. 6(B) a perspective view showing a ceramic slider, and FIG. 6(C) a perspective view showing a head core.
Figure 6B:
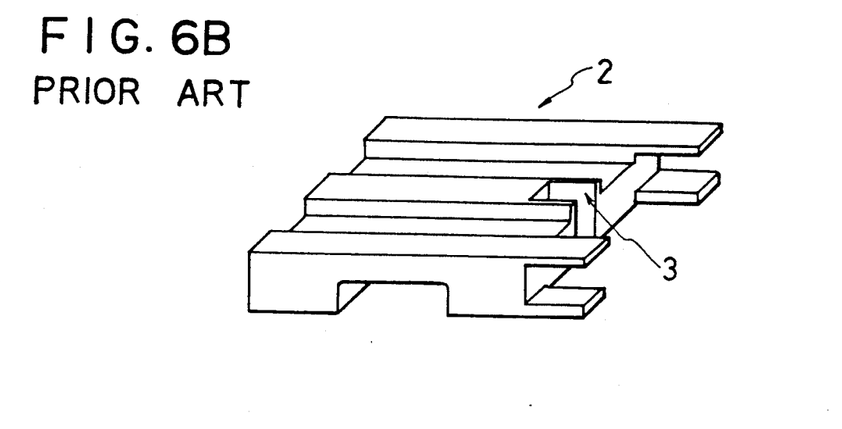
Figure 6C:
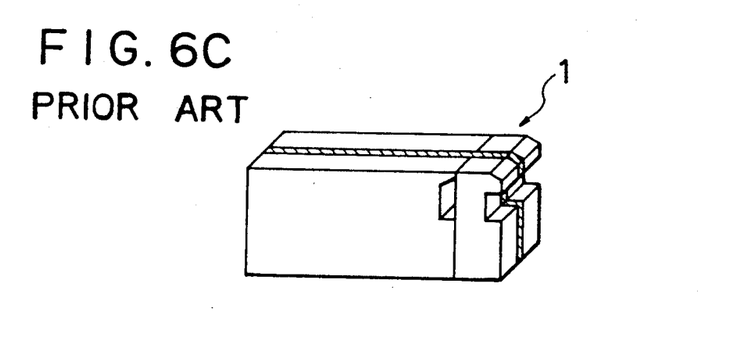

Also, a thin layer laminated, composite flying magnetic head which employs a laminated thin film core as a head core has been employed in a VCR system. This laminated thin film core is obtained by laminating a magnetic Fe-Si-Al (Sendust) alloy film or an amorphous alloy film on a non-magnetic substrate. Such a composite head with a laminated thin film core is disclosed in, for example, Japanese Patent Application Public Disclosure No. 18617/1987. In this flying magnetic head, a head core 1 is fitted into and bonded by a bonding glass to a slot 3 which has a predetermined form and which is formed in a ceramic slider 2 formed by cutting and polishing a monolithic ceramic, as shown in FIG. 6(A) to FIG. 6(C) of the present application.

The present inventors found in the process of developing the composite flying magnetic head that an unbalanced wear occurs between the slider and the head core, that the surface of the bonding glass is made rough during the CSS (contact-start-stop) operation, and that dust contaminating particles) attaches to the rough surface of the bonding glass, lowering the ability with which the magnetic head withstands the CSS operation.

Figure 5:
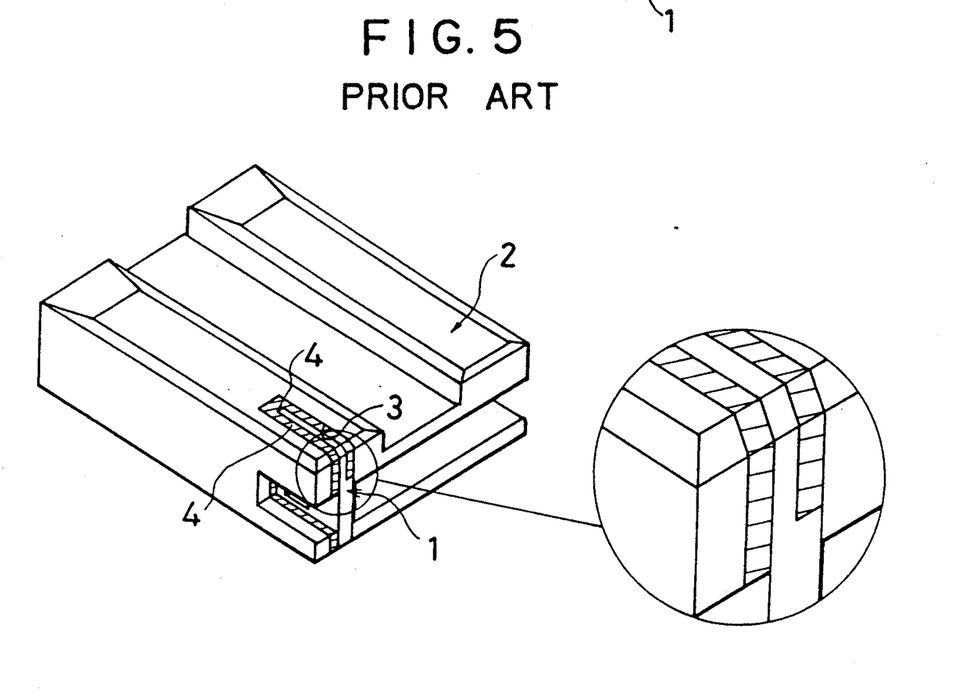
FIG. 5 is a perspective view of a conventional ferrite, composite, flying magnetic head.

That is, in the ferrite and MIG composite flying magnetic heads, the slider and the head core are made of different materials, and the portion of the head core located near the gap is made thinner, as shown in FIG. 5, in order to achieve reduction in the track width and the surface area of the bonding glass layer is thus increased. In consequence, the ability with which the magnetic head withstands the CSS operation is reduced. Furthermore, in the conventional composite flying head with laminated thin film core, no consideration is given to the surface area of the bonding glass.

The present inventors made intensive studies to solve this drawback of the conventional magnetic heads and found that it can be solved in a composite flying magnetic head which employs a laminated thin film core as a head core when the housing (or slider) and non-magnetic substrate of the head core are made of the same material, when the coefficient of thermal expansion of the material of the substrate of the head core is substantially the same as that of the magnetic thin film of the head core, and when the thickness of the bonding glass layer which bonds the head core to the slider is reduced to a very small value.

That is, when the slider and the substrate of the head core (head chip) are made of the same material, an unbalanced wear between the slider and head core is eliminated. When the coefficient of thermal expansion of the slider is substantially the same as that of the substrate of the head core, the stress applied to the bonding glass layer which bonded the head core to the slider, can be reduced greatly, and hence, deterioration of the glass layer after bonding can be prevented resulting in an increase of reliability thereof.

Figure 7:
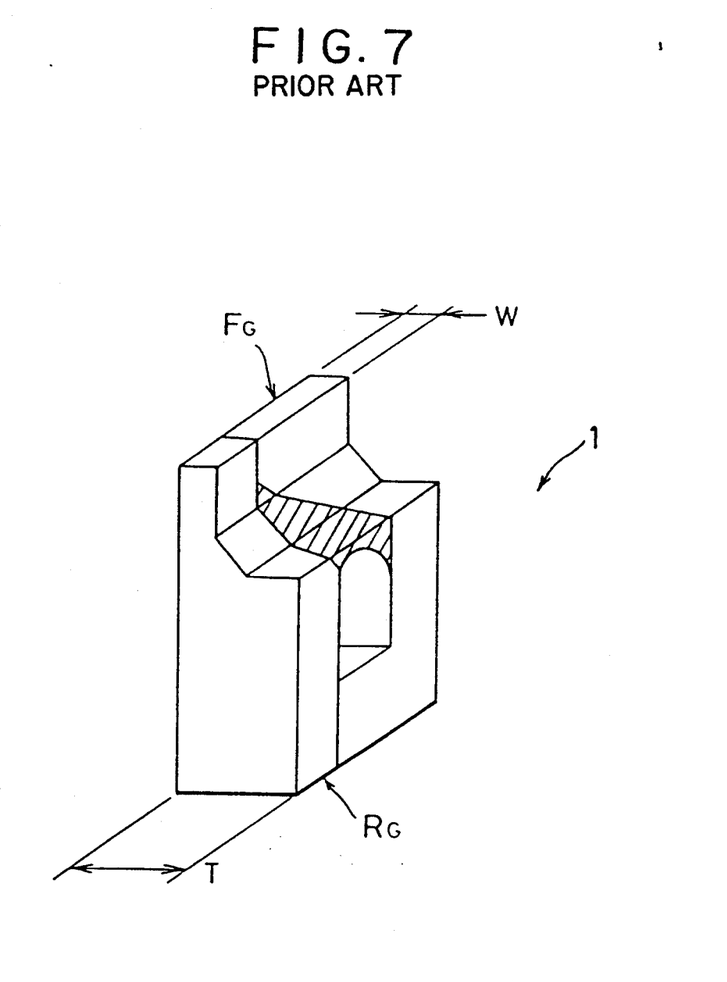
FIG. 7 is a perspective view of a head core (head chip) of a conventional ferrite composite type.

Further, though in the conventional ferrite head type and MIG composite flying magnetic heads, as shown in FIG. 7, only a front gap portion (FG) is shaped to make a track width (W) narrower, the thickness (T) of a rear gap portion (RG) should be between about 150 $\mu$m to about 200 $\mu$m maintain a mechanical strength of the head core. For example, when the track width (W) is less than 20 $\mu$m the thickness of the glass layer to bond the head core 1 to the slider requires a thickness of about 100 $\mu$m to about 200 $\mu$m.

On the other hand, since in the head core of the present invention the track width can be determined by the thickness of the magnetic alloy layer both sides of which are reinforced by a ceramic material, the thickness of the glass layer to bond the head core to the slider can be reduced greatly.

Thus, the present invention can realize a composite head as a whole without deterioration of the glass used for the glass layer, with maintaining high reliability and by making the thickness of the bonding glass layer less than 20 $\mu$m, further less than 10 $\mu$m.

Further, according to the present invention the thickness of the bonding glass layer can be reduced greatly, thereby reducing the rough surface area of the mechanically weak glass layer and, hence, the amount of dust (contaminating particles) adhered to that surface. This results in the improvement in the ability with which the magnetic head withstands the CSS operation.

When the coefficient of thermal expansion of the substrate of the head core is substantially the same as that of the magnetic thin film of the head core, stress applied to the magnetic thin film can be reduced, thereby eliminating deterioration in the magnetic characteristics of the head.

The present invention is based on the above-described novel knowledges.

SUMMARY OF THE INVENTION

Accordingly, an object of the present invention is to provide a composite flying magnetic head with a laminated thin film core being used as a head core which eliminates an unbalanced wear between a slider and a non-magnetic substrate of a head core, which allows the surface area of a bonding glass layer to be reduced and, hence, the amount of dust adhered to that surface to be reduced, which improves CSS withstanding ability, and which allows a stress applied to a magnetic material to be reduced to achieve improved head characteristics.

To this end, the present invention provides a flying magnetic head in which a head core, formed by laminating a magnetic thin film on a non-magnetic substrate, is fitted into a slot formed in a slider through a bonding glass layer. This flying magnetic head is characterized in that the substrate of the head core and the slider are made of the same material, in that a coefficient of thermal expansion of the substrate of the head core is substantially the same as that of the magnetic thin film, and in that the thickness of the bonding glass layer which bonds the head core to the slider is reduced to 20 μm or less. In a preferred form, the substrate of the head core and the slider are made of a ceramic material expressed by $Co_xNi_{2-x}O_2$ (where $0.2 \leq X \leq 1.8$), and the magnetic thin film is made of Fe-Si-Al alloy.

In the ceramic material from which the substrate of the head core and the slider are manufactured and which has a basic composition consisting of CoO and NiO, at least 0.1 to 5% by weight of one selected from the group consisting of $MnO$, $TiO_2$, $Al_2O_3$ and $CaO$ may be present. At least one selected from the group consisting of 1 to 5% by weight of $Y_2O_3$, 0.1 to 1% by weight of TiN, and 0.3 to 2% by weight of $B_2O_3$ may also be present. Furthermore, the substrate of the head core and the slider may also be made of a mixed ceramic which has a basic composition consisting of 30 mol % or less of MgO, 30 mol % or less of CaO, and a balance of CoO and NiO which exist in the form of $Co_xNi_{2-x}O_2$ (where $0.2 \leq x \leq 1.8$), and which has a rock salt structure.

BRIEF DESCRIPTION OF THE DRAWINGS

FIGS. 3(A)–3(F) show the manufacturing process of a head core.

DESCRIPTION OF THE PREFERRED EMBODIMENTS

An embodiment of the flying magnetic head according to the present invention will now be described with reference to the accompanying drawings.

Figure 4:
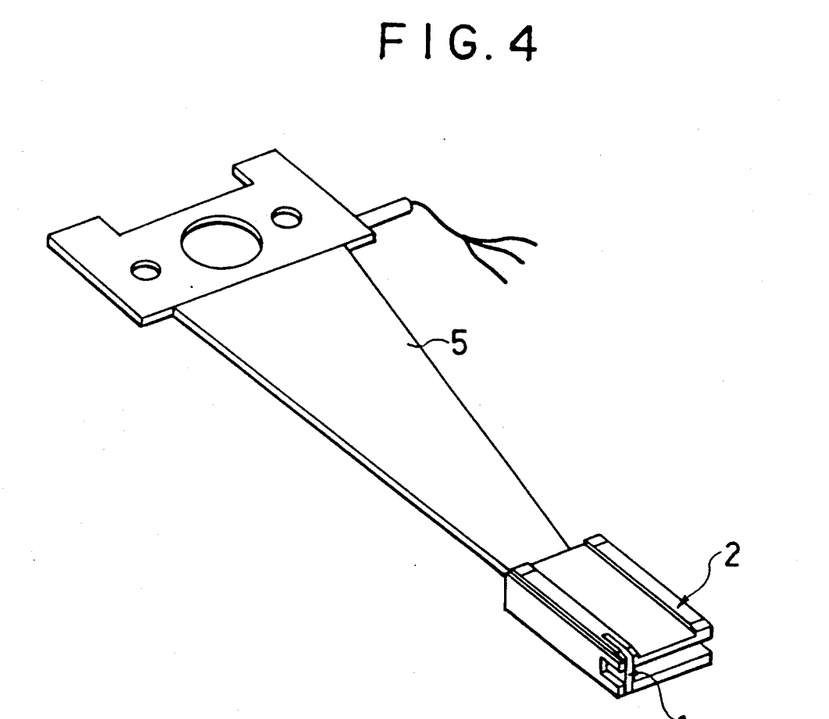
FIG. 4 is a perspective view of the entire structure of the composite, flying magnetic head according to the present invention.

Referring first to FIG. 4, a composite flying magnetic head of the present invention includes a slider 2 and a head core 1 like the conventional heads. The magnetic head is connected through a suspension system 5.

An example of a method of manufacturing a laminated thin film core, in which a thin magnetic layer is laminated on a non-magnetic substrate and which is used as the head core 1, will be described below with reference to FIG. 3. An Fe-Si-Al alloy or an amorphous can be used as the magnetic thin film. In this embodiment, the Fe-Si-Al alloy is used.

Figure 3A:
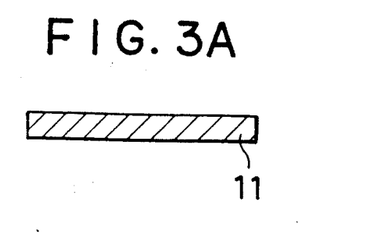
FIG. 3(A) is a cross-section of a non-magnetic substrate.
Figure 3B:
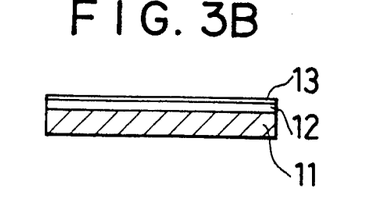
FIG. 3(B) is a cross-section of the same non-magnetic substrate upon which an Fe-Si-Al alloy film and non-magnetic insulating film have been deposited by sputtering.

First, a non-magnetic substrate 11 is prepared (FIG. 3(A)). Thereafter, an Fe-Si-Al alloy film 12 is deposited on the substrate 11 to a thickness of 1 to 20 μm by sputtering, and a non-magnetic insulating film 13 is then deposited on the Fe-Si-Al alloy film 12 to a thickness of 0.03 to 0.5 μm by sputtering (FIG. 3(B)). The non-magnetic insulating film may be made of $SiO_2$ or $Al_2O_3$.

Figure 3C:
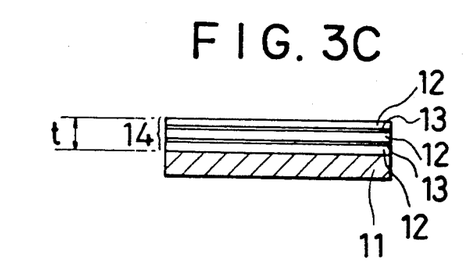
FIG. 3(C) is a cross-section of the film-coated substrate of FIG. 3(B) after repeated coating cycles, resulting in the deposit of a laminated magnetic alloy.

The above-described deposition of a combination of the Fe-Si-Al alloy film 12 and the non-magnetic insulating film 13 is repeated a required number of times to form a laminated magnetic alloy film 14 on the substrate 11, as shown in FIG. 3(C)). Preferably, the total thickness (t) of the laminated magnetic alloy film 14 is set to 30 μm or less from the economical point of view.

Figure 3D:
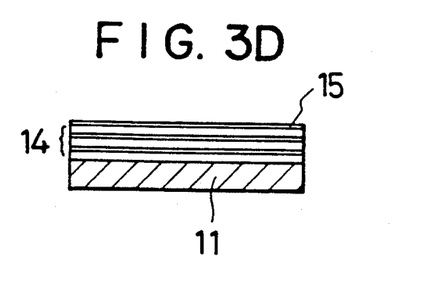
FIG. 3(D) is a cross-section of the article of FIG. 3(C) following formation thereon of a glass film by sputtering.
Figure 3E:
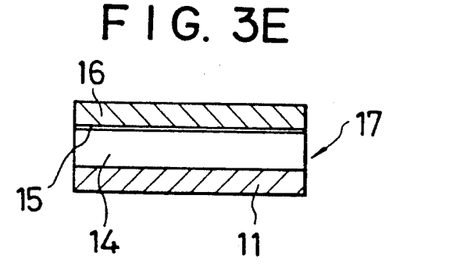
FIG. 3(E) is a cross-section of a magnetic core block formed by bonding a non-magnetic substrate to the surface of the glass film of the FIG. 3(D) article.

Subsequently, a glass film 15 is formed on the laminated alloy film 14 to a thickness of 0.05 to 1.0 μm by sputtering (FIG. 3(D)), and a non-magnetic substrate 16, which is made of the same material as that of the substrate 11 and which, together with the substrate 11, makes a pair, is then bonded to the surface of the glass film 15 to produce a magnetic core block 17 (FIG. 3(E)). The glass film 15 may be a $SiO_2$-$Al_2O_3$-$Na_2O$ or $SiO_2$-$B_2O_3$-$Na_2O$ type glass.

Figure 3F:
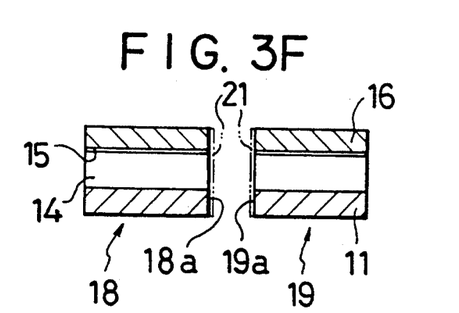
FIG. 3(F) is a cross-section of the magnetic core block of FIG. 3(E) after the block has been longitudinally cut to form a pair of core halves.

Thereafter, the magnetic core block 17 is cut into two portions in the direction of the height thereof, as shown in FIG. 3(F), to form a pair of core halves 18 and 19.

Figure 2:
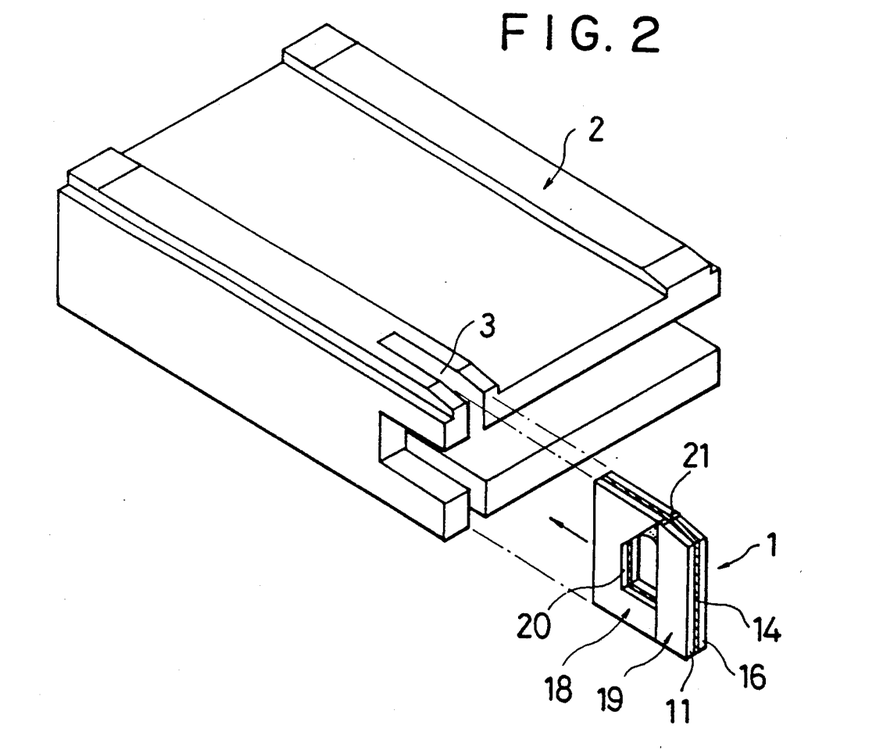
FIG. 2 is a perspective view of the composite, flying magnetic head according to the present invention.

Next, after a winding groove 20 has been formed in at least one of the core halves, which is the core half 18 in this embodiment, as shown in FIG. 2, contact surfaces 18a and 19a of the two core halves 18 and 19 are polished and a non-magnetic gap spacer 21, made of, for example, $SiO_2$, is then deposited on the contact surfaces 18a and 19b by sputtering or the like (FIG. 3(F)). Thereafter, the contact surfaces 18a and 19a of the core halves 18 and 19 are glass bonded to each other to obtain the laminated thin film head core 1, as shown in FIG. 2.

Figure 1:
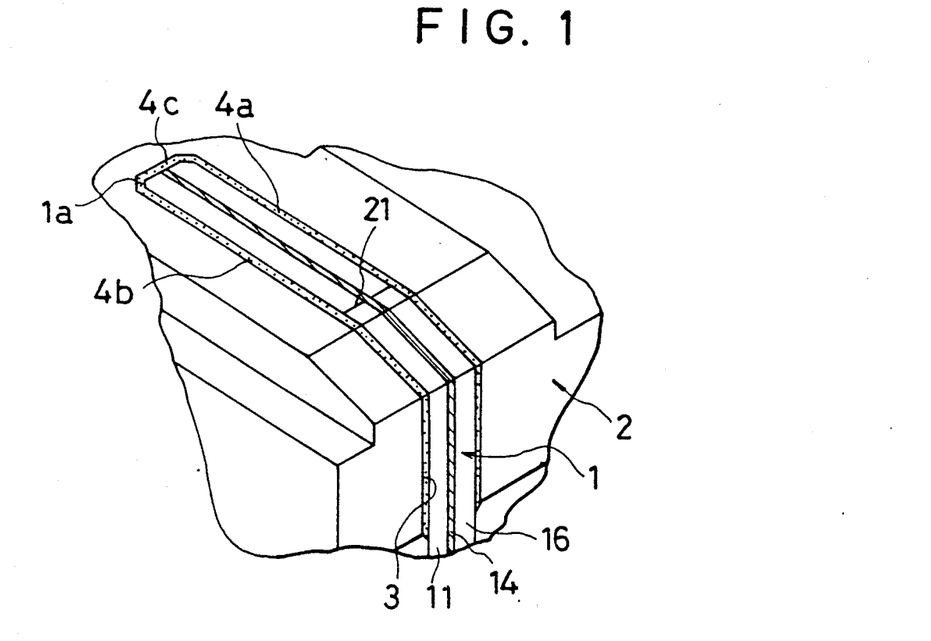
FIG. 1 is an enlarged view of the essential parts of a composite flying magnetic head according to the present invention.

Subsequently, the head core 1 is fitted into a slot 3 formed in the slider 2 in such a manner that it has predetermined dimensions with a bonding glass layer 4 (which includes bonding glass layers 4a, 4b and 4c) therebetween, as shown in FIGS. 1 and 2, to form a composite, flying magnetic head.

In this above-arranged flying magnetic head according to the present invention, the non-magnetic substrates 11 and 16 of the head core 1 and the slider 2 are made of the same material, and the substrates 11 and 16 of the head core 1 and the magnetic alloy thin film 14, that is, Sendust, have substantially the same coefficient of thermal expansion, and the bonding glass layer 4 has a thickness of 20 μm or less.

Generally, the Fe-si-Al alloy film has a coefficient (α) of thermal expansion of 135 to 150 $\times 10^{-7}$/°C., so a material having such a coefficient of thermal expansion is selected as the material of the substrates 11 and 16 of the head core 1.

The coefficient of (α) thermal expansion of $Al_2O_3$-TiC and $CaTiO_3$ type ceramics, which are considered to be the optimum materials of the slider, are respectively 75 to $80 \times 10^{-7}$/°C. and 110 to $115 \times 10^{-7}$/°C., and the difference between the coefficient of thermal expansion of Sendust and those of these ceramics is therefore great. Hence, such ceramics cannot be used in this embodiment.

The present inventors made a research to develop a material having substantially the same coefficient of thermal expansion as that of a Sendust thin film, and found an oxide expressed by $Co_xNi_{2-x}O_2$ (where $0.2 \leq x \leq 1.8$) fulfills the requirement. The coefficient of thermal expansion of the oxide having such a composition can be readily adjusted to a range of 128 to $150 \times 10^{-7}$/°C. Also, the oxide having such a composition has a hardness (Vickers hardness) of 550 to 600, which is very close to that of Sendust. As will be described in detail later, tests were conducted using a dummy slider made of the above-described ceramic. In the tests, the ceramic itself exhibited an excellent ability with which it withstood the CSS operation as the conventionally employed ceramic slider material, such as $CaTiO_3$, did.

The present inventors also made a research on the additives and found that it was advantageous to add 0.1 to 5% by weight of one selected from the group consisting of MnO, $TiO_2$, $Al_2O_3$ and CaO to the above-described basic composition. Introduction of MnO promotes sintering, addition of $TiO_2$ or CaO increases the hardness of a product, and $Al_2O_3$ suppresses grain growth.

Presence of 1 to 5% by weight of $Y_2O_3$ is advantageous to suppress grain growth, addition of 0.1 to 1% by weight of TiN increases the hardness of a product, and presence of 0.3 to 2% by weight of $B_2O_3$ promotes sintering.

Addition of these additives provides a material having a hardness of 600 to 700, which is closer to that of Sendust.

The present inventors also studied ceramic mixtures which contained $Co_xNi_{2-x}O_3$ (where $0.2 \leq x \leq 1.8$), and found that a ceramic mixture whose composition consisting of 30 mol % of MgO, 30 mol % of CaO, and a balance of CoO and NiO existing in the form of $Co_xNi_{2-x}O_2$ (where $0.2 \leq x \leq 1.8$) which has a rock salt structure could also be used in the present invention.

MgO and CaO promote sintering and increase the hardness of a product. The coefficient of thermal expansion of MgO and CaO does not differ greatly from that of CoO and NiO. If the proportion of MgO and CaO is not within the above-range, the coefficient of thermal expansion greatly reduces, and segregation occurs, thereby reducing a density.

The present inventors manufactured a flying magnetic head in which the substrates of a head core and a slider were made of a ceramic, whose basic composition is consisted of CoO and NiO, and found that the manufactured magnetic head exhibited excellent matching of heat between its components. As a result, the stress applied to the bonding glass layer 4 which bonded the head core (head chip) to the slider is greatly reduced, and hence, deterioration of the glass layer after bonding can be prevented resulting in an increase of reliability thereof.

Further, though in the conventional ferrite head type and MIG composite flying magnetic heads, as shown in FIG. 7, only a front gap portion (FG) is shaped to make a track width narrower and to define the track width (W), the thickness (T) of a rear gap portion (RG) should be between about 150 μm to about 200 μm to maintain a mechanical strength of the head core.

For example, when the track width (W) is less than 20 μm the thickness of the glass layer to bond the head core 1 to the slider requires a thickness of about 100 μm to about 200 μm.

On the other hand, since in the head core of the present invention the track width can be determined by the thickness of the magnetic alloy layer both sides of which are reinforced by a ceramic material, the thickness of the glass layer to bond the head core to the slider can be reduced greatly.

Thus, the present invention can realize a composite head as a whole without deterioration of the glass used for the glass layer, with maintaining high reliability by making the thickness of the bonding glass layer less than 20 μm, further less than 10 μm. The accuracy with which the head core is fitted into the slider dictates the lower limit of the thickness of the bonding glass layer. With the current technical standard, however, the lower limit is 2 to 3 μm.

Since the bonding glass layer 4 has a thickness of 10 μm or less, the surface area of the mechanically weak bonding glass layer can be reduced, thereby greatly reducing the amount of dust (contaminating particles) adhered thereto and improving the ability with which the magnetic head withstands the CSS operation. This will be detailed later with reference to FIGS. 8 and 9.

Next, an example of a ceramic that can be used in this invention will be described in detail.

CoO and NiO were mixed in a ratio which ensured a mixture whose composition was $CoNiO_2$. This mixture was temporarily sintered at 1000° C. in the atmosphere of $N_2$, and then pulverized for 22 hours by a wet type ball mill of ethanol. The obtained powder was CIP formed and then sintered at 1350° C. in the atmosphere of $O_2$.

Thereafter, the sintered body was subjected to HIP process at 1280° C. for 1 hour under 1000 kg cm².

The sintered body exhibited the following characteristics.

(1) Density: 6.5 g/cm³
(2) Hardness (Hv): 700
(3) Deflective strength: 30 kg mm²
(4) Average crystal grain size: 6.8 μm
(5) Coefficient of thermal expansion: $136 \times 10^{-7}$/°C.

The coefficient of thermal expansion of the sintered body, which was determined by the composition thereof, was $128 \times 10^{-7}$ to $150 \times 10^{-7}$/°C.

A flying magnetic head was manufactured by using a slider and the substrates of a head core which were made of the thus-obtained ceramic.

The groove formed in the slider 2 as the slot 3 was chamfered by 10 to 20 μm to form end surfaces 1a of the head core 1, as shown in FIG. 1.

Table 1 shows the results of the CSS tests on the flying magnetic heads and the dummy sliders which were respectively made of the material of this embodiment and CaTiO₃.

TABLE 1

| Number of Times for CSS | First Time | | 10000 Times | | 20000 Times | | 5000 Times | |
|---|---|---|---|---|---|---|---|---|
| | Stiction | μ | Stiction | μ | Stiction | μ | Stiction | μ |
| Sample Conventional Dummy Slider | No | 0.34 | No | 0.32 | No | 0.34 | — | — |
| Dummy Slider of this Invention | No | 0.23 | No | 0.22 | No | 0.31 | — | — |
| Conventional Magnetic Head | No | 0.37 | Yes | 0.70 | Yes | — | — | — |
| Magnetic Head of this Invention | No | 0.22 | No | 0.27 | No | 0.27 | No | 0.42 |

μ: coefficient of dynamic frictions

As can be seen from Table 1, since in the flying magnetic head of this invention the thickness of the bonding glass layer 4 could be reduced to 20 μm or less, the amount of dust (contaminating particles) adhered to the glass layer could be reduced, and the ability with which the magnetic head withstood the CSS operation could thus be improved.

The dummy slider made of the above ceramic withstood the CSS operation as excellently as that made of the conventional CaTiO₃. Thus, it was made clear that the ceramic whose basic composition consisted of CoO and NiO of this example withstood the CSS operation well by itself.

When the CSS operation was tested on the dummy slider made of the ceramic whose basic composition consisted of MnO and NiO, stiction occurred before the number of the CSS cycles reached 10,000. This ceramic was therefore inadequate as the material for a slider.

The ability with which the slider or the magnetic head withstood the CSS operation was measured using a 3.5 inch disk on which a carbon film was coated. In the measurements, the disk was first rotated in such a way that the speed thereof increased to 3600 rpm over 4 seconds. Thereafter, the disk was maintained in that condition for 1 second, and the speed was then reduced to zero over 4 seconds. The disk was again maintained in that state for 1 second. Thereafter, the cyclic operation consisting of the above steps was repeated.

Figure 8:
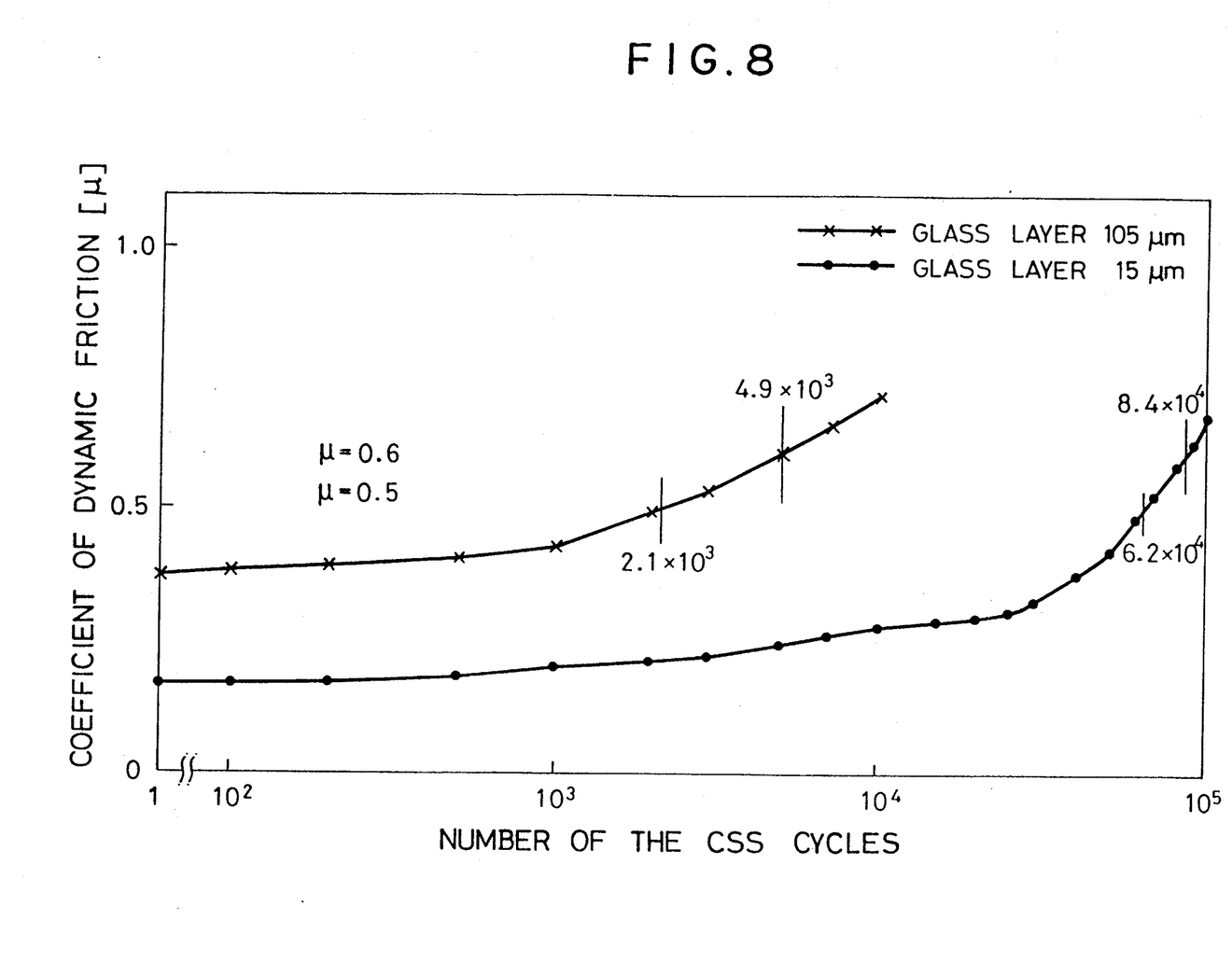
FIG. 8 is a graph showing the relation between the number of the CSS cycles and the coefficient of dynamic friction.

Next, the ability with which the magnetic head withstood the CSS operation was measured using the magnetic heads whose bonding glass layer 4 had various thicknesses. FIG. 8 shows the relation between the member of the CSS cycles and the coefficient of dynamic friction ($\mu$). The coefficient of dynamic friction reaches 0.5 and 0.6 when the number of CSS cycles $2.1 \times 10^3$ and $4.9 \times 10^3$, respectively, in the case of the bonding glass layer having a thickness of 105 μm, and when the number of the CSS cycles $6.2 \times 10^4$ and $8.4 \times 10^4$, respectively, in the case of the bonding glass layer having a thickness of 15 μm. It is clear from the graph of FIG. 8 that the magnetic head withstands the CSS operation excellently when the bonding glass layer has a thickness of 20 μm or less.

Figure 9:
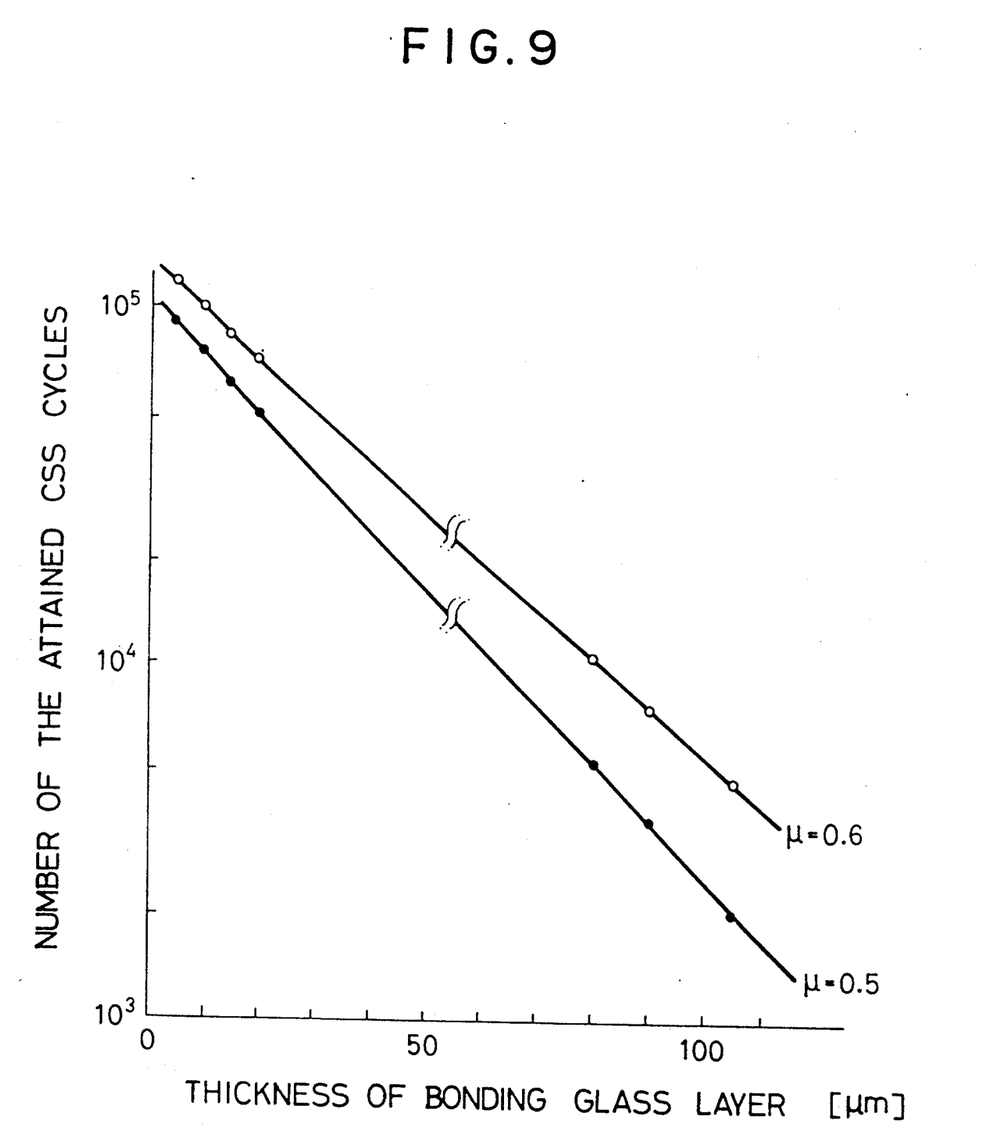
FIG. 9 is a graph showing the relation between the attained thickness of a bonding glass layer and the number of the CSS cycles.

FIG. 9 is a graph showing the relation between the thickness of the bonding glass layer and the number of the attained CSS cycles. It is clear from the graph of FIG. 9 that the thickness of the bonding glass layer must be 20 μm or less if it is desired to accomplish the number of the CSS cycles 50,000 and 70,000, respectively, before the coefficient of dynamic friction reaches 0.5 and 0.6.

In the above-described embodiment, a Sendust magnetic thin film is used in the head core. However, an amorphous magnetic thin film can also be employed. In that case, if an amorphous thin film made of, for example, a rare earth element-Co alloy magnetic body, having a coefficient of thermal expansion ($\alpha$) of 110 to $120 \times 10^{-7}/°C.$, is employed, a material having such a coefficient of thermal expansion is selected as the material of the substrates 11 and 16 of the head core 1 and that of the slider 2. Suitable ceramic materials include an MgO type ceramic.

As will be understood from the foregoing description, in the flying magnetic head according to the present invention, unbalanced wear between the slider and the non-magnetic substrate of the head core occurs less, and dust adheres less on the surface of the bonding glass layer due to reduction of the surface area thereof. Furthermore, the stress applied to the magnetic material can be reduced and the ability with which the magnetic head withstands the CSS operation and the head characteristics of the head can be improved.

What is claimed is:

1. A flying magnetic head in which a head core, formed by laminating a magnetic thin film on a non-magnetic substrate, is fitted into a slot formed in a slider through a bonding glass layer,
    the improvement comprising said substrate of said head core and said slider being formed of the same material, in that a coefficient of thermal expansion of said substrate of said head core is substantially the same as that of said magnetic thin film, and in that the thickness of said bonding glass layer which bonds said head core to said slider is reduced to 20 μm or less.

2. A flying magnetic head according to claim 1, wherein said substrate of the head core and the slider comprises a ceramic material expressed by the formula $Co_xNi_{2-x}O_2$ where $0.2 \leq x \leq 1.8$, and wherein said magnetic thin film comprises Fe-Si-Al alloy.

3. A flying magnetic head according to claim 2 wherein the substrate of the head core and the slider is formed from a ceramic material having a basic composition comprising CoO and NiO, and further containing 0.1 to 5% by weight of at least 1 oxide selected from the group of Mno, TiO₂, Al₂O₃ and CaO.

4. A flying magnetic head according to claim 2 wherein the substrate of the head core and the slider is formed from a ceramic material having a basic composition comprising CoO and NiO, further comprising at least one member selected from the group consisting of 1 to 5% by weight $Y_2O_3$, 0.1 to 1% by weight TiN, and 0.3 to 2% by weight $B_2O_3$.

5. A flying magnetic head according to claim 2 wherein the substrate of the head core and the slider is formed from a mixed ceramic having a basic composition consisting essentially of 30 mol % or less MgO, 30% or less CaO, the balance being CoO and NiO existing in the form of $Co_xNi_{2-x}O_2$ where $0.2 \leq x \leq 1.8$, and which has a rock salt structure.

* * * * *